United States Patent

[11] 3,627,709

| [72] | Inventors | Karl-Friedrich Hansen<br>Mannheim;<br>Johann Zizlsperger, Frankenthal, both of Germany |
|---|---|---|
| [21] | Appl. No. | 825,442 |
| [22] | Filed | May 16, 1969 |
| [45] | Patented | Dec. 14, 1971 |
| [73] | Assignee | Badische Anilin- & Soda- Fabric Aktiengesellschaft<br>Ludwigshafen/Rhine, Land Rheinland Pfalz, Germany |
| [32] | Priority | Dec. 10, 1964 |
| [33] | | Germany |
| [31] | | P 14 94 977.0 |
| | | Continuation of application Ser. No. 511,970, Dec. 6, 1965, now abandoned. This application May 16, 1969, Ser. No. 825,442 |

[54] PRODUCTION OF FOAM THERMOPLASTICS USING A BLOWING AGENT AND A VISCOSITY INCREASING AGENT
7 Claims, No Drawings

[52] U.S. Cl. .................................................... 260/2.5 R,
260/17.4 R, 260/28.5 A, 260/28.5 AU, 260/29.6 B, 260/29.6 XA, 260/29.6 WA, 260/33.4 R, 260/33.4 PQ, 260/41 A, 260/41 B, 260/857, 260/897, 260/899
[51] Int. Cl. .................................................... C08f 47/10, C08j 1/26
[50] Field of Search .......................................... 260/2.5

[56] References Cited
UNITED STATES PATENTS

| 2,739,134 | 3/1956 | Parry et al. ................... | 260/2.5 EP |
|---|---|---|---|
| 2,831,820 | 4/1958 | Aase et al. ................... | 260/2.5 EP |
| 3,102,865 | 9/1963 | Sneary et al. ................ | 260/2.5 |

*Primary Examiner*—Murray Tillman
*Assistant Examiner*—Morton Foelak
*Attorneys*—Richard L. Johnston, Lloyd C. Root, Daniel V. O'Keeffe, Herbert B. Keil, Matthew C. Thompson and John H. Shurtleff ABSTRACT: Process for the production of expanded crystalline thermoplastics by emulsification under pressure of a polymer melt and a nonmiscible expanding agent of a comparable viscosity and releasing the pressure or cooling the unexpanded emulsion and heating it in a mold.

PRODUCTION OF FOAM THERMOPLASTICS USING A BLOWING AGENT AND A VISCOSITY INCREASING AGENT

This application is a continuation-in-part of our application Ser. No. 511,970 filed Dec. 6, 1965, now abandoned.

Various methods are already known for the production of crystalline foam thermoplastics. According to one method, which has been adopted in industry particularly for the production of foam polyolefins, homogeneous mixtures of plastics and compounds which upon being heated decompose with the disengagement of gaseous cleavage products are heated to temperatures higher than the softening point of the plastics. This method has the disadvantage however that moldings can be prepared only up to a certain thickness because expanded articles having a greater thickness than this collapse again after expansion as the heat cannot be removed. Moreover it is not possible by this method to prepare light foams; thus for example in the case of polyethylene only moldings have a density of down to 0.2 g./cc. are obtained.

In another commercially significant method the molten plastic is mixed under pressure with an organic liquid whose boiling point is lower than the softening point of the plastic and the homogeneously swollen melt is then relieved of pressure. The mixture then expands under the action of the vapor pressure of the liquid. It is a disadvantage of this method that the mixture of plastic and organic liquid has to be expanded immediately after having been mixed because it has been found that such mixtures, in the case of crystalline polyolefins, are not stable at room temperature and are therefore not storable. Because of the flammability of the organic expanding agent, it is usually also necessary to take expensive precautions to suck off the expanding agent which escapes from the mixture during expansion.

We have now found that crystalline foam plastics are obtained in a particularly advantageous manner by heating to a temperature above the melting point of the plastic an emulsion in a crystalline thermoplastic of a liquid which does not diffuse into the plastics melt at the temperature at which the emulsion is prepared and which contains at least one component which boils at a temperature lower than the melting point of the plastic.

Crystalline thermoplastics are defined as those which at room temperature contain a crystalline fraction of at least 20 percent (measured as X-ray crystallinity). Examples of suitable crystalline thermoplastics are polyethylene, polypropylene and polyvinyl chloride. The associates present in the latter (see: Hengstenberg and Schuch, Makromolekulare Chemie, volume 74 (1964), 55) in addition to a low crystallinity of 5 to 10 percent, cause an apparently higher degree of crystallization.

The process is suitable particularly for the production of foam plastics from polyolefins having crystalline fractions of more than 20 percent, such as polyethylene or copolymers of ethylene with propylene, other n-olefins and vinyl acetate, acrylic esters of alcohols having two to eight carbon atoms, such as n-butyl, tertiary-butyl and 2-ethylhexyl acrylates, polypropylene or copolymers of propylene. Mixtures of the said polymers with each other or if desired with other polymers may also be used. It is also possible to use mixtures of ethylene polymers and bitumen or other extenders.

The liquids which are contained in the emulsions should only diffuse into the plastics melt to a slight extent or not at all. The liquids should consist of at least two components. Particularly useful liquids are solutions of a viscosity raising agent in a solvent. They should contain at least one component which boils below the melting point of the plastic. Particularly suitable solvents for expansion of polyolefins are water and methanol. Sometimes it is advantageous to use mixtures of the said compounds.

Liquids are used whose viscosity is 0.01 to 10 times, advantageously 0.1 to 1 times, the viscosity of the plastics melt at the temperature at which emulsification is carried out. This temperature at which the emulsion is formed is above the melting point, preferably 30° to 100° C. above the melting point, of the plastic. It is important that the said viscosity behavior should be maintained during the production of the emulsions. In the present case the viscosities are determined by determining the torsional moment which the melt or highly viscous liquid exerts on a cylinder rotating in an autoclave. Under the simplified postulation of the presence of Newtonian liquids, the torsional moment is proportional to the viscosity.

The liquids contain a substance which raises the viscosity of the solvent into the desired range. This substance should be homogeneously miscible with the other components of the liquid. Examples of suitable viscosity raising substances are soluble high molecular weight compounds, such as polyvinyl alcohol, polyalkylene oxides, polyamides, e.g. those described in Houben-Weyl, XIV, 2, page 167, polyacrylates or alginates. Inorganic polymerized compounds such as silicates capable of swelling e.g. bentonite or montmorillonite, or clay suspensions, are also suitable. The added liquids may also be highly viscous emulsions or dispersions, e.g. with silica gel or aluminum hydroxide gels. Amounts of these viscosity raising additives which are from 0.5 to 25 percent by weight with reference to the total amount of liquid are in general used.

The liquids may also contain dissolved in them substances which form inert gases at the temperature prevailing during expansion. In this case a pressure of more than 1 atmosphere gauge is set up in the cells after the expanded plastic has been cooled. The expanded plastics may then be subjected again to an expansion process. Examples of suitable substances are ammonium salts, such as ammonium carbonate or ammonium nitrate, or ammonia or carbon dioxide dissolved under pressure in water. Other additives, such as stabilizers, fillers, flame protectives or peroxide cross-linking agents may also be contained therein in emulsified or dispersed form.

The amount of liquid for expansion, which has to be contained in the emulsions, depends on the desired degree of expansion, on the temperature at which the emulsion is to be expanded and on the thermal equilibrium between (a) the vaporization heat and expansion heat of the liquid to be vaporized and (b) the thermal capacity of the polymer melt to be cooled down. The proportions are advantageously selected so that the polymer melt is cooled to below its crystallization point. The upper limit to the amount of liquid is set by the phase reversal of the emulsion. The maximum of liquid to be used is that which is still dispersed in the plastic in the form of isolated drops. Amounts of liquid of from 3 to 40 parts by volume of liquid, preferably more than 10 parts by volume, to 100 parts by volume of polymer melt are in general used. The emulsions should advantageously contain droplets having a diameter of 1 to 50 microns which are isolated from each other.

The emulsions may be prepared for example by stirring the liquids into the plastics melts in an autoclave. At a constant stirring output, a finer disperison of the liquid in the plastics melt is achieved the more nearly the viscosities of the two phases approximate. Best results are obtained with liquids whose viscosity is from one tenth to equal that of the polymer melt. Thus it is possible for example to emulsify liquid and polymer in an extruder and to pass the resultant emulsion into a bath of water so that expansion is avoided. The emulsion may then be reduced in size.

For expansion, the emulsions are heated to temperatures above the melting point of the plastic. It is advantageous to operate in a range which is up to 50° C. above the melting point of the plastic, even higher with cross-linked polymers. Melting point is defined as the crystallite melting point which can be measured penetrometrically.

In accordance with a particularly advantageous method, the emulsions are heated to temperatures above the melting point of the plastic under a pressure which is equal to or higher than the vapor pressure of the liquid at the temperature used, followed by pressure release to a pressure which is below the vapor pressure of the liquid.

Thus for example the emulsions may be prepared by incorporating the liquids into the molten plastics in an extruder under pressure, the resultant emulsion being extruded through a nozzle into a chamber which is under a lower pressure, for example atmospheric pressure. It is also possible to melt emulsions in the form of a granulate in an extruder under inert gas pressure, so that expansion of the emulsions in the extruder inlet is avoided. The emulsion is then extruded as described above.

According to another variant of the method, the emulsions in the form of small particles are heated in closed molds from which gas can escape but the plastic cannot escape. Upon heating to temperatures above the melting point of the polymer particles, they expand and fuse together to form a molding corresponding in its dimensions to the cavity of the mold.

The finely particled emulsions advantageously have a particle diameter of from 1 to 5 mm. In this method, obviously only such proportions by volume of finely particled emulsions should be introduced into the mold that the particles can expand within the mold cavity.

An advantageous procedure is for example first to heat the particles, for example by blowing in superheated steam, under a pressure which is equal to or higher than the vapor pressure of the liquids at the temperature used and then to release the pressure so that the particles expand and fuse together. Heating of the particles may be effected for example by blowing in hot gases or vapors, by pouring in hot liquids, by infrared heating or by introducing the particles into a high frequency filed.

The particles may also be heated in a loose heap so that expanded discrete particles are obtained which have a multiple of their original volume.

It is also possible first to process the emulsions in the unexpanded condition into moldings, for example plates, and then to heat the moldings. The above description has been given merely to illustrate the various embodiments of the invention. The invention is not limited to these particular variants.

By the process according to the invention, foam plastics can be obtained whose density is in general from 30 to 500 kg./cubic meter. The foams in general have cells whose diameter is from 100 to 5000 microns depending on the working conditions. They are suitable for example for thermal insulation, as sound deadening materials or for the production of packaging. It is a particular advantage that the emulsions may be stored at room temperature for almost an unlimited time so that they may be prepared for example at one place and expanded at any other place. It is another advantage that in many cases, a physiologically harmless liquid, such as water, may be introduced into the emulsion so that during expansion it is unnecessary to take any precautions for sucking off toxic vapors or vapors which form explosive mixtures with air, such as are unavoidable in some prior art methods.

The invention is further illustrated by the following examples in which the parts specified are parts by weight and the percentages are percentages by weight.

EXAMPLE 1

High pressure polyethylene having a viscosity $[\eta]$ of 1.5 and containing 45 percent of crystalline constituents is mixed with the respective liquid (see table I) at a temperature of 160° C. in a kneader under a nitrogen pressure of 5 atmospheres gauge. After kneading has continued for 5 minutes, an emulsion of the solution in the molten polyethylene is obtained, the emulsified droplets having a diameter of about 5 to 20 microns.

The emulsion obtained is forced through a nozzle into a water bath kept at 20° C. so that the emulsion is obtained in the form of a strand without being expanded. The strand is then broken up into a fine granulate.

The granulate is placed in a closed mold whose walls are provided with fine bores at regular distances. The mold with the granulate in it is heated in a pressure chamber by means of superheated steam at 140° C. The chamber is then vented to atmospheric pressure so that the granulate expands and fuses together to form a molding having the shape of the mold cavity.

TABLE 1

| Parts of high pressure polyethylene | Liquid, consisting of— | | | Density of resulting foam |
|---|---|---|---|---|
| | Parts of water | Parts of viscosity increasing agent | | |
| 90 | 9.5 | 0.5 | Polyethylene oxide of mol wt. 500,000. | 100 |
| 90 | 9 | 1 | Gelatine. | 280 |
| 80 | 15 | 5 | Silica gel. | 85 |
| 85 | 12 | 3 | Sodium alginate. | 110 |
| 80 | 15 | 5 | Aluminium hydroxide gel. | 92 |
| 88 | 10 | 2 | Bentonite. | 120 |
| 85 | 12 | 3 | Polyamide from adipic acid and 2,2'-diaminodiethylene diamine, mol. wt. 8,000. | 115 |
| 82 | 15 | 3 | Polycondensation product of caprolactam, 2,2'-diaminodiethylamine and urea, molar ratio 2:1:1. | 76 |
| | Parts of methanol | | | |
| 82 | 15 | 3 | Copolyamide of caprolactum adipic acid, and 1,6-diaminohexane, molar ratio 3:2:2. | 50 |

EXAMPLE 2

Low pressure polyethylene having a viscosity $[\eta]=1.7$ and a crystalline fraction of 75 percent at room temperature is melted in a double screw extruder (D=20) at a temperature of about 160° C. Such an amount of a solution of 2 parts of polyvinyl alcohol in a mixture of 9 parts of water and 9 parts of methanol is forced at 160° C. into the polyethylene melt in the middle of the extruder cylinder that there are 20 parts of the solution to each 80 parts of polyethylene. This solution has the same viscosity at 160° C. as the polyethylene melt. Under the kneading action of the extruder screws, an emulsion of the solution in the molten polyethylene is obtained which is extruded through a flat sheeting die into a chamber which is at atmospheric pressure. The nozzle is dimensioned so that a pressure develops in the extruder cylinder which is higher than the vapor pressure of the solution so that the emulsion does not expand until it has left the nozzle. Sheeting of expanded polyethylene is obtained having a density of 62 kg./cubic meter and cells having an average diameter of 1 mm.

EXAMPLE 3

Sixty parts of polypropylene having a viscosity $[\eta]=1.9$ and a crystalline fraction of 82 percent is mixed in a stirred autoclave with 40 parts of a 25 percent suspension of alumina in water at 220° C. After stirring has been continued for 25 minutes, a homogeneous emulsion is obtained which is discharged through an extruder and after leaving the extruder head expands to a foam having the density of 32 kg./cubic meter.

EXAMPLE 4

Eighty parts of a copolymer of vinyl acetate and ethylene (containing 12 percent of vinyl acetate units) which has a viscosity $[\eta]=1.0$ and an X-ray crystallinity of 30 percent is mixed in a stirred autoclave with 20 parts of a solution of 1 part of polyethylene oxide (molecular weight 500,000) and 9 parts of methanol at 150° C. One part of ditertiary-butyl peroxide is added as crosslinker. The whole is stirred for 1 hour at 140° C. and the melt, which is still capable of flowing, is transferred to a pressure mold which is under the same pressure in which cross-linking is completed by heating for another hour. The pressure mold is then released from pressure at 100° C. The mold is full of a viscoelastic fine-pored foam having a density of 80 kg./cubic meter.

EXAMPLE 5

Twenty-five parts of an emulsion (consisting of 12 parts of water, 12 parts of polyvinylidene chloride emulsified therein and 1 part of ammonium polyacrylate) is incorporated into 75 parts of low pressure polyethylene according to example 2 in a double screw extruder having an inbuilt kneading zone. The emulsion is extruded through a strand die which discharges beneath water, so that unexpanded grains of granulate are obtained. This granulate is placed in a mold and heated in a high frequency field of 13.6 MHz. so that the granulate grains fuse together as they expand to form a molding having a density of 100 kg./cubic meter.

EXAMPLE 6

Five parts of a highly viscous solution consisting of 10 parts of polymethacrylate in 90 parts of acetone is emulsified in 95 parts of high pressure polyethylene as used in example 1 in a double screw extruder. The emulsion is extruded through a strand die having an underwater discharge. Unexpanded particles are obtained. The emulsion granulate is melted in a single screw extruder having an inlet which is under pressure and is expanded upon leaving the extruder nozzle. The density of the expanded product is 70 kg./cubic meter.

EXAMPLE 7

Sixty parts of polyvinyl chloride having a K-value of 59 is melted in a double screw extruder and 35 parts of an aqueous highly viscous emulsion consisting of 80 parts of water and 20 parts of ammonium polymethacrylate is emulsified in. The viscosity of the aqueous solution is about one tenth of the viscosity of the polyvinyl chloride melt. Upon extrusion from the extruder, the product expands to form a loose foam having a density of 90 kg./cubic meter.

We claim:

1. A process for the production of expandable thermoplastic polymers which comprises dispersing 3–40 parts by volume of a liquid nonmiscible expanding agent in 100 parts by volume of a molten crystalline thermoplastic polymer from the class consisting of polymers of olefinically unsaturated monomers from the group consisting of polyethylene, polypropylene, polyvinyl chloride, copolymers of ethylene with propylene, copolymers of ethylene and vinyl acetate, and copolymers of ethylene and acrylic esters of alcohols having two to eight carbon atoms to provide an emulsification of said expanding agent in said thermoplastic polymer, said liquid expanding agent not diffusing into said thermoplastic polymer and containing at least one liquid component from the group consisting of water and methanol which boils at a temperature lower than the melting point of said thermoplastic polymer and a sufficient amount of a viscosity increasing agent miscible with said liquid but not diffusing into said polymer so that the ratio of the viscosity of said expanding agent to the viscosity of the thermoplastic polymer melt at the temperature at which the resultant emulsion is prepared is 0.01:1 to 10:1, under a pressure which is higher than the vapor pressure of said liquid component of said expanding agent at the temperature used.

2. A process as claimed in claim 1 wherein said crystalline thermoplastic polymer is a polyolefin having a crystalline fraction of more than 20 percent.

3. A process as claimed in claim 1 wherein the viscosity of said liquid nonmiscible expanding agent is 0.1 to 1 times the viscosity of the thermoplastic polymer melt at the temperature at which the resultant emulsion is prepared.

4. A process as claimed in claim 1 in which the pressure on the resultant emulsion is released while the temperature is higher than the melting point of said thermoplastic polymer to a pressure below the vapor pressure of said liquid component of said nonmiscible expanding agent, thereby expanding said thermoplastic polymer.

5. A process as claimed in claim 1 in which the resultant emulsion is cooled without expanding said thermoplastic polymer.

6. A process as claimed in claim 1 in which said viscosity increasing agent is a polymer homogeneously miscible with said liquid component of said liquid nonmiscible expanding agent.

7. A process for the production of expanded thermoplastic polymers which comprises heating an emulsion of 3–40 parts by volume of a liquid nonmiscible expanding agent in 100 parts by volume of a crystalline thermoplastic polymer from the group consisting of polymers of olefinically unsaturated monomers from the group consisting of polyethylene, polypropylene, polyvinyl chloride, copolymers of ethylene with propylene, copolymers of ethylene and vinyl acetate, and copolymers of ethylene and acrylic esters of alcohols having two to eight carbon atoms, said liquid expanding agent not diffusing into the thermoplastic polymer and containing at least one liquid component from the group consisting of water and methanol and a sufficient amount of a viscosity increasing agent miscible with said liquid component but not diffusing into said polymer so that the ratio of the viscosity of said expanding agent to the viscosity of said thermoplastic polymer when said thermoplastic polymer is in the molten state is 0.01:1 to 10:1, to a temperature which is higher than the melting point of said thermoplastic polymer and above the vaporization temperature of said liquid component under the pressure conditions used.

* * * * *

PO-1050
(5/69)

UNITED STATES PATENT OFFICE
CERTIFICATE OF CORRECTION

Patent No. 3,627,709      Dated December 14, 1971

Inventor(s) Karl-Friedrich Hansen and Johann Zizlsperger

It is certified that error appears in the above-identified patent and that said Letters Patent are hereby corrected as shown below:

First page, left-hand column, eighth line, "Fabric" should read -- Fabrik --; fifteenth line, "Continuation" should read -- Continuation-in-part --.

Column 2, line 54, "disperison" should read -- dispersion --.

Column 3, line 28, "filed" should read -- field --.

Signed and sealed this 23rd day of May 1972.

(SEAL)
Attest:

EDWARD M.FLETCHER, JR.
Attesting Officer

ROBERT GOTTSCHALK
Commissioner of Patents